US012658582B2

(12) United States Patent
Lai et al.

(10) Patent No.: US 12,658,582 B2
(45) Date of Patent: Jun. 16, 2026

(54) ANTENNA STRUCTURE AND ELECTRONIC DEVICE USING THE SAME

(71) Applicant: Chiun Mai Communication Systems, Inc., New Taipei (TW)

(72) Inventors: Chih-Hung Lai, New Taipei (TW); Yen-Hui Lin, New Taipei (TW); Wei-Cheng Su, New Taipei (TW); Yun-Jian Chang, New Taipei (TW); Geng-Hong Liou, Tu-Cheng (TW); Cho-Kang Hsu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 186 days.

(21) Appl. No.: 18/094,495

(22) Filed: Jan. 9, 2023

(65) Prior Publication Data

US 2023/0238700 A1 Jul. 27, 2023

(30) Foreign Application Priority Data

Jan. 21, 2022 (CN) ......................... 202210084178.3

(51) Int. Cl.
*H01Q 5/48* (2015.01)
*H01Q 1/52* (2006.01)

(52) U.S. Cl.
CPC ............... *H01Q 5/48* (2015.01); *H01Q 1/526* (2013.01)

(58) Field of Classification Search
CPC .......... H01Q 5/48; H01Q 1/526; H01Q 5/371; H01Q 9/42; H01Q 13/10; H01Q 1/243; H01Q 5/20; H01Q 1/002; H01Q 1/36; H01Q 25/04; H01Q 5/357
See application file for complete search history.

(56) References Cited

U.S. PATENT DOCUMENTS 7,450,076 B1 * 11/2008 Lin .......................... H01Q 9/40 343/702
9,196,966 B1 * 11/2015 Obeidat ................. H01Q 13/10
10,804,612 B2 * 10/2020 Wu ...................... H01Q 13/106
11,171,409 B2 * 11/2021 Chen ...................... H01Q 1/243
11,217,873 B2 1/2022 Wu et al.
11,283,181 B2 3/2022 Wu et al.
(Continued)

FOREIGN PATENT DOCUMENTS

CN 206076499 U * 4/2017 ............. H01Q 13/10
CN 110071365 A * 7/2019 ............... H01Q 1/36
(Continued)

*Primary Examiner* — Dameon E Levi
*Assistant Examiner* — Jordan E. DeWitt
(74) *Attorney, Agent, or Firm* — ScienBiziP, P.C.

(57) ABSTRACT

An antenna structure for a metal-cased electronic device includes a radiator, a feed portion, and a slit. The feed portion can feed signals into the radiator, the radiator includes a first end and a second end, the first end disposes a first radiation portion, the second end disposes a second radiation portion and a third radiation portion, the second radiation portion and the third radiation portion are coupled to each other to radiate a radiation signal at a first frequency band, the slit and the radiator is spaced at intervals, and the slit is coupled to the first radiation portion to radiate the radiation signal at a second frequency band. The present disclosure also provides an electronic device with the antenna structure.

18 Claims, 12 Drawing Sheets

(56) References Cited

U.S. PATENT DOCUMENTS

2005/0190108 A1* 9/2005 Lin ........................ H01Q 5/371
343/702
2007/0103367 A1* 5/2007 Wang ........................ H01Q 9/42
343/700 MS
2008/0180330 A1* 7/2008 Wei-Shan .............. H01Q 5/371
343/700 MS
2008/0316118 A1* 12/2008 Puente Baliarda .... H05K 1/025
343/702
2011/0001673 A1* 1/2011 You ........................ H01Q 1/243
343/702
2012/0098707 A1* 4/2012 Chou ........................ H01Q 9/42
343/700 MS
2013/0002519 A1* 1/2013 Camacho .............. G06F 1/1616
343/905
2013/0321226 A1* 12/2013 Cho ........................ H01Q 13/10
343/860
2015/0015454 A1* 1/2015 Tsai ........................ H01Q 1/521
343/893
2017/0033445 A1* 2/2017 Okajima .............. H04B 1/3818
2019/0006764 A1* 1/2019 Yen ...................... H01Q 13/106
2019/0020111 A1* 1/2019 Tseng ..................... H01Q 5/328
2019/0027811 A1* 1/2019 Chen ...................... H01Q 13/10
2019/0229755 A1* 7/2019 Lee ...................... H04B 1/0053
2020/0185813 A1* 6/2020 Chang ...................... H01Q 1/48
2020/0274231 A1* 8/2020 Wei ........................ H01Q 5/364
2021/0098878 A1* 4/2021 Wu ........................ H01Q 11/14
2021/0151858 A1 5/2021 Wu et al.
2021/0159602 A1* 5/2021 Wu ........................ H01Q 13/16
2021/0313692 A1* 10/2021 Tai ....................... H01Q 9/0407
2022/0294113 A1* 9/2022 Chiang .................. H01Q 5/385
2022/0368016 A1* 11/2022 Lin ........................ H01Q 5/371
2023/0216177 A1* 7/2023 Wu .......................... H01Q 1/38
343/702
2023/0238700 A1* 7/2023 Lai ......................... H01Q 1/243
343/702
2023/0291100 A1* 9/2023 Lin ........................ H01Q 5/371

FOREIGN PATENT DOCUMENTS

CN 112821039 A * 5/2021 ............... H01Q 1/48
CN 112838369 A * 5/2021 ............. H01Q 5/314
EP 3823096 A2 * 5/2021 ............... H01Q 1/48
TW I596831 B 8/2017
TW 201902031 A 1/2019
TW I723744 B 4/2021

* cited by examiner

ANTENNA STRUCTURE AND ELECTRONIC DEVICE USING THE SAME

CROSS-REFERENCE TO RELATED APPLICATIONS

The present application claims the benefit of and priority to Chinese patent application NO. 202210084178.3, field on Jan. 21, 2022, the entirety of which is incorporated herein by reference.

FIELD

The present disclosure relates to the field of server technology, in particular to a motherboard protection circuit and a server.

BACKGROUND

With the progress of wireless communication technology, mobile phones, personal digital assistants and other electronic devices offer diversified functions, are lightweight, faster and more efficient in data transmission. There is a design trend toward more metallic and thinner wireless communication devices. On the premise of ensuring the appearance design of the antenna structure, how to improve the space utilization of the antenna structure and increase its signal radiation frequency band has become an urgent problem for those skilled in the art.

Therefore, improvement is desired.

BRIEF DESCRIPTION OF THE DRAWINGS

Implementations of the present disclosure will now be described, by way of embodiments, with reference to the attached figures.

DETAILED DESCRIPTION

Figure 1:
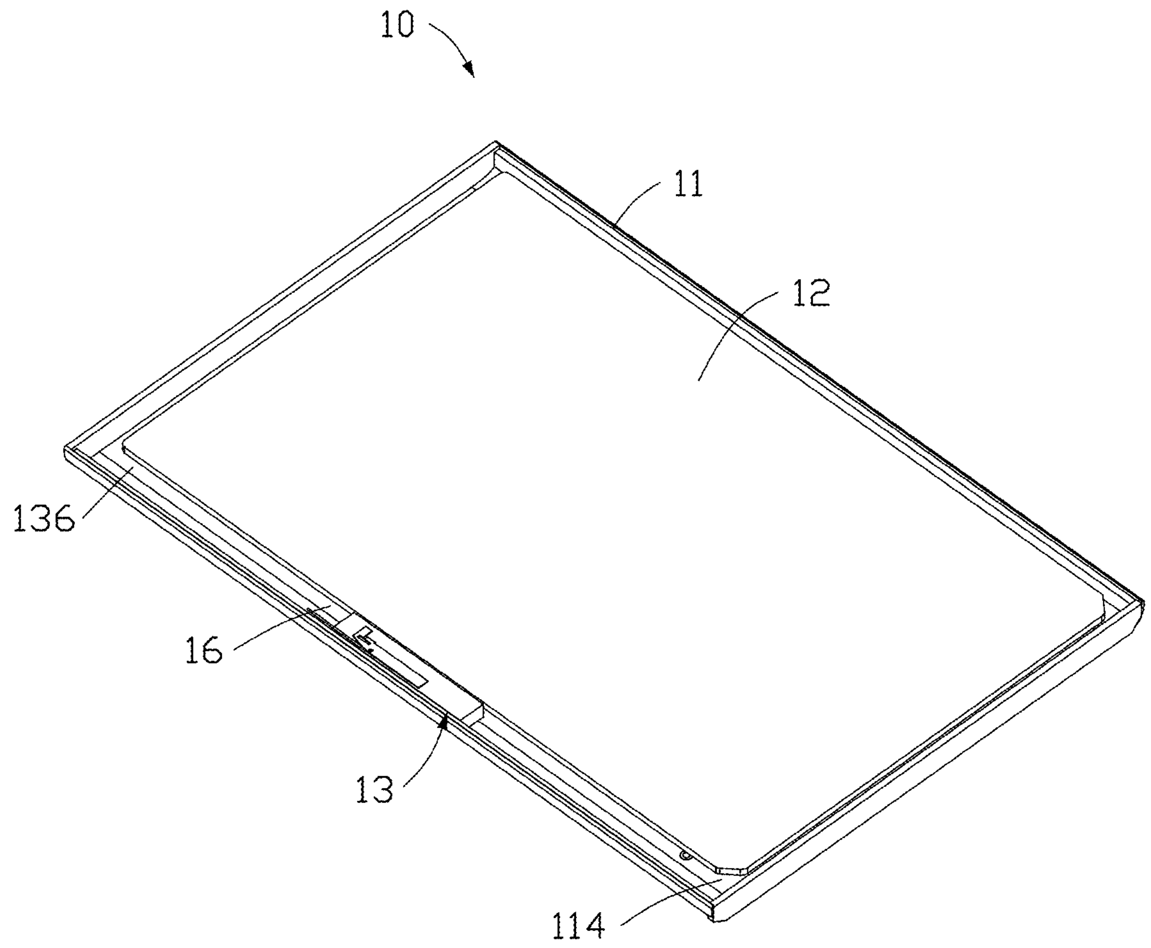
FIG. 1 is a schematic diagram of an embodiment of an electronic device of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Figure 2:
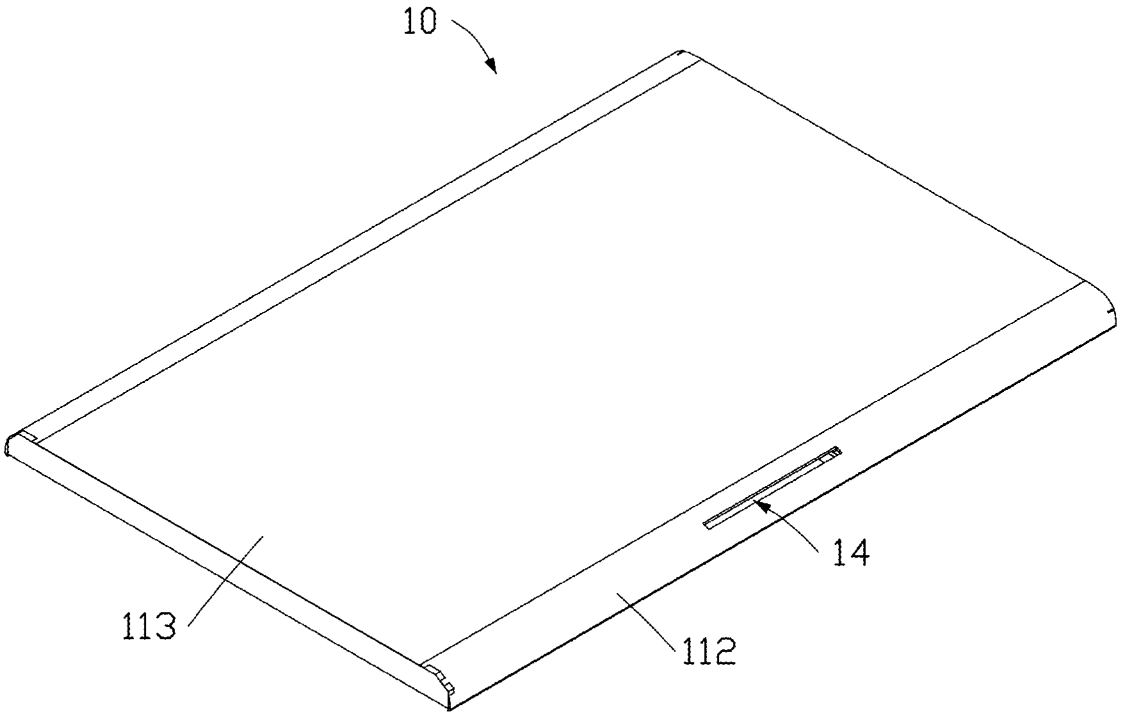
FIG. 2 shows another perspective of the electronic device as shown in FIG. 1.

FIGS. 1 and 2 illustrate an antenna structure 13 in accordance with an embodiment of the present disclosure. The antenna structure 13 can be applied to an electronic device 10. The electronic device 10 can transmit and receive radio waves to transmit and exchange radio signals. The electronic device 10 can be a handheld communication device (such as a mobile phone), a foldable phone, an intelligent wearable device (such as a watch, headphones), a tablet computer, a personal digital assistant (PDA), a smart watch, a TV, or a smart car, there are no specific restrictions here.

In some embodiments, the antenna structure 13 can be a monopole antenna, a planar inverted F-shaped antenna (PIFA), a multi branch antenna, etc. The embodiment takes the antenna structure 13 as a three-branch monopole antenna for example.

The electronic device 10 can include a housing 11 and a screen 12. The housing 11 is made of metal materials, which can be the shell of the electronic device 10.

The housing 11 includes a frame 112, a backplane 113, and a ground portion 136. The frame 112 is roughly in a circular structure and is disposed at the periphery of the backplane 113. The frame 112 and the backplane 113 are integrally formed, and the part of the frame 112 connecting the backplane 113 is in an arc transition. The frame 112 and the backplane 113 can form a receive space 114. One side of the frame 112 defines an opening (not shown in the figure) for accommodating the screen 12 of the electronic device 10. The screen 12 has a display plane which is exposed to the opening. The screen 12 can be accommodated in the receive space 114. There is a gap 16 between at least one side of the frame 112 and the screen 12, and the antenna structure 13 can be accommodated in the gap 16.

In some embodiments, the ground portion 136 can be made of metal or other conductive materials. The ground portion 136 may be disposed in the receive space 114 enclosed by the frame 112 and the backplane 113, and connected to the backplane 113 to provide grounding for the antenna structure 13. One side of the frame 112 defines a slit 14, and the antenna structure 13 is spaced with the slit 14.

In the embodiment, the length of the slit 14 is 40 mm, and the width of the slit is 2 mm.

In some embodiments, the slit 14 can be filled with insulating materials, such as plastic, rubber, glass, wood, ceramics, etc. The slit 14 can be a key hole, a subscriber identity module (SIM) card slit, a memory card slit or other input/output (I/O) interface of the electronic device 10, and the shape of the slit 14 can be adjusted according to specific needs, such as straight, diagonal, zigzag, etc.

Figure 3:
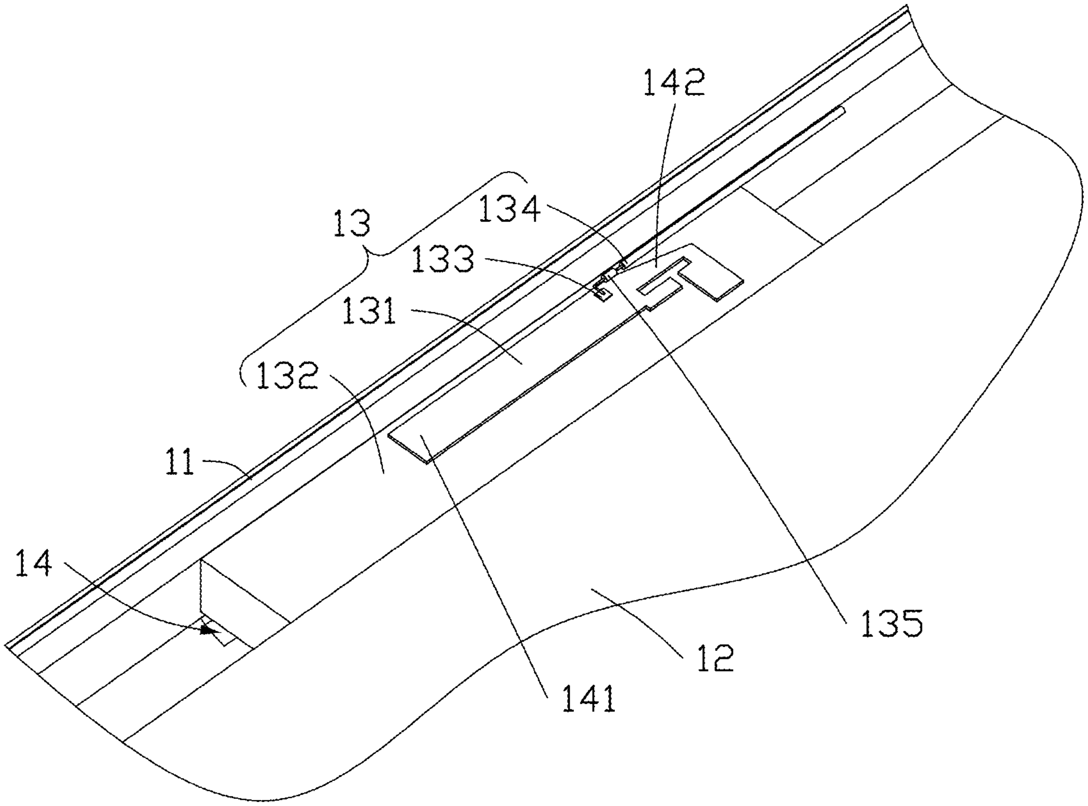
FIG. 3 is a schematic diagram of an embodiment of an antenna structure of the present disclosure.
Figure 4:
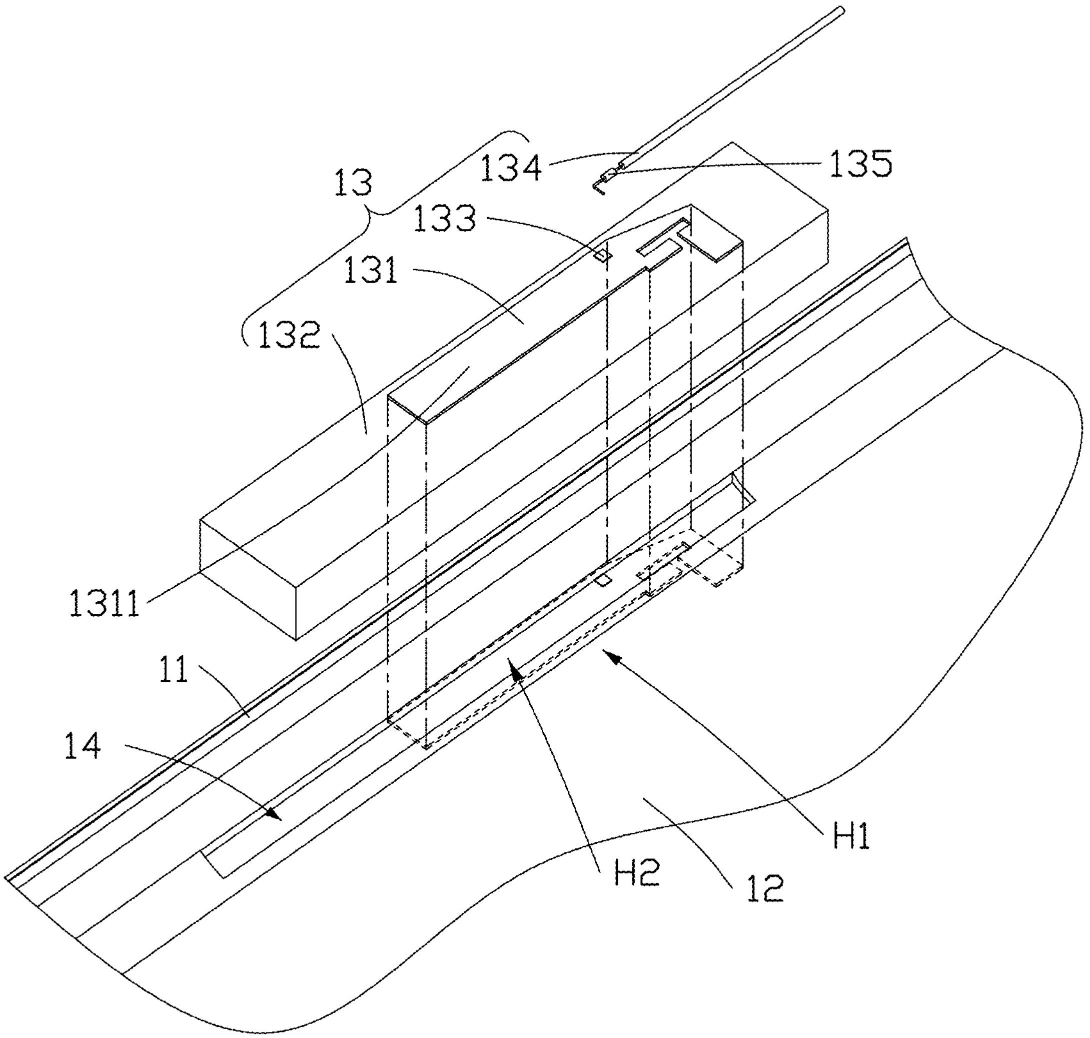
FIG. 4 is a disassembled antenna structure as shown in FIG. 3.
Figure 5:
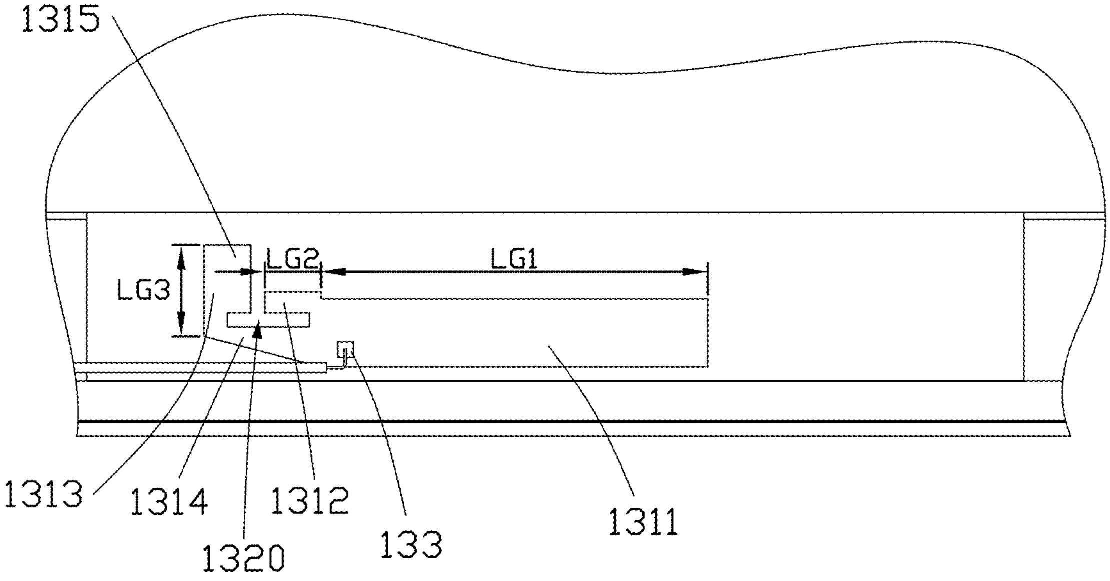
FIG. 5 is a schematic diagram of a radiator of the antenna structure shown in FIG. 3.

Referring to FIG. 3 to FIG. 5, the antenna structure 13 includes a radiator 131, a support member 132, a feed portion 133 and a feed line 134. The radiator 131 is in the shape of a curved sheet, the radiator 131 may be a flexible printed circuit (FPC), or the radiator 131 can be formed by Laser Direct Structuring (LDS) process.

The radiator 131 includes a first end 141 and a second end 142. The first end 141 is the end far from the feed portion 133, and the second end 142 is the end closer to the feed portion 133. A first radiation portion 1311 is disposed on the first end 141, and a second radiation portion 1312 and a third radiation portion 1313 are disposed on the second end 142. The first radiation portion 1311 is roughly in a long strip shape, and its extension direction is parallel to the extension direction of the slit 14. At least one part of the slit 14 is disposed in the projection H1 of a plane where the radiator 131 is located in the vertical direction. In one embodiment, at least one part of the slit 14 is disposed in the projection H2 of a plane where the first radiation portion 1311 of the radiator 131 is located in the vertical direction. At least one part of the slit 14 may be located in the projection, or the slit 14 is completely located in the projection. The second radiation portion 1312 is connected between the first radiation portion 1311 and the third radiation portion 1313, and the extension direction of the second radiation portion 1312 is opposite to the extension direction of the first radiation portion 1311.

The third radiation portion 1313 includes a first extension portion 1314 and a second extension portion 1315. The first extension portion 1314 is disposed close to the feed portion 133 and connected to the second extension portion 1315. The extension direction of the first extension portion 1314 is close to the extension direction of the second radiation portion 1312, and the first extension portion 1314 is spaced with the second radiation portion 1312. The second extension portion 1315 is vertically disposed with the first extension portion 1314. The end of the second radiation portion 1312 extends towards the second extension portion 1315 of the third radiation portion 1313, the second radiation portion 1312 and the third radiation portion 1313 form a semicircle, the length of the first radiation portion 1311 is greater than the length of the of the second radiation portion 1312, and the length of the first radiation portion 1311 is greater than the length of the third radiation portion 1313. In the embodiment, the second radiation portion 1312 and the third radiation portion 1313 are disposed to enclose to form a T-shape slit 1320. For example, the second radiation portion 1312, the first extension portion 1314, the third radiation portion 1313, and the second extension portion 1315 form the T-shape slit 1320.

In the embodiment, the length LG1 of the first radiation portion 1311 is 16 mm, the length LG2 of the second radiation portion 1312 is 5.5 mm, and the length LG3 of the second extension portion 1315 of the third radiation portion 1313 is 10.2 mm.

In the embodiment, one end of the radiator 131 can be electrically connected to the ground portion 136 by means of shrapnel, microstrip line, strip line, coaxial cable, etc., and the radiator 131 can be grounded.

The feed portion 133 is disposed on the radiator 131, and the feed portion 133 is electrically connected to the feed line 134. The feed portion 133 is disposed close to the first extension portion 1314 of the third radiation portion 1313. A signal feed source transmits a current signal to the feed portion 133 through the feed line 134, and the feed portion 133 is used to feed the signal into the radiator 131. In some embodiments, the feed portion 133 may be made of iron parts, metal copper foils, conductors in the laser direct forming (LDS) process, and other materials. The feed line 134 can be a spring sheet, a microstrip line, a strip line, a coaxial cable, etc. This embodiment takes the coaxial cable as an example to explain.

In the embodiment, the first radiation portion 1311, the second radiation portion 1312 and the third radiation portion 1313 share the feed portion 133. The three radiation portions are electrically connected to the feed portion 133, and the three radiation portions are connected to each other. The antenna structure 13 of the embodiment of the disclosure can realize different radiation frequency bands through different signal coupling methods or different signal current paths, so that the antenna structure 13 forms multiple monopole antennas.

In some embodiments, the at least one part of the support member 132 can be disposed in the slit 14, or the support member 132 can be disposed between the slit 14 and the radiator 131 to support and fix the radiator 131 and provide electromagnetic shielding for the radiator 131. The support member 132 can make the radiator 131 far away from the housing 11, thereby reducing the electromagnetic interference between the radiator 131 and the housing 11. The support member 132 can make the radiator 131 close to the slit 14, so that the radiator 131 can be coupled to the slit 14 to generate radiation.

In some embodiments, a match circuit 135 is further disposed between the feed portion 133 and the signal feed source. When the signal feed source transmits the current signal to the feed portion 133 through the feed line 134, the match circuit 135 can be disposed between the end of the feed line 134 close to the signal feed source and the signal feed source, or the match circuit 135 can be disposed between the end of the feed line 134 close to the feed portion 133 and the feed portion 133. The match circuit 135 is used to match the impedance of the signal output by the signal feed source, and transmit the impedance matched current signal to the feed portion 133. The match circuit 135 can be L-type match circuit, T-type match circuit, π type match circuit or other capacitors, inductors, and combinations of capacitors and inductors.

In some embodiments, the match circuit 135 may be disposed between the radiator 131 and the ground portion 136. The ground portion 136 can be electrically connected to the radiator 131 through the dielectric such as spring piece, microstrip line, strip line, coaxial cable, etc. to provide grounding for the radiator 131.

In some embodiments, the match circuit 135 can also be disposed between any combination of the first radiation portion 1311, the second radiation portion 1312, and the third radiation portion 1313 and the ground portion 136, and the match circuit 135 is used for impedance matching of the current signal of the corresponding radiation portion.

Figure 6:
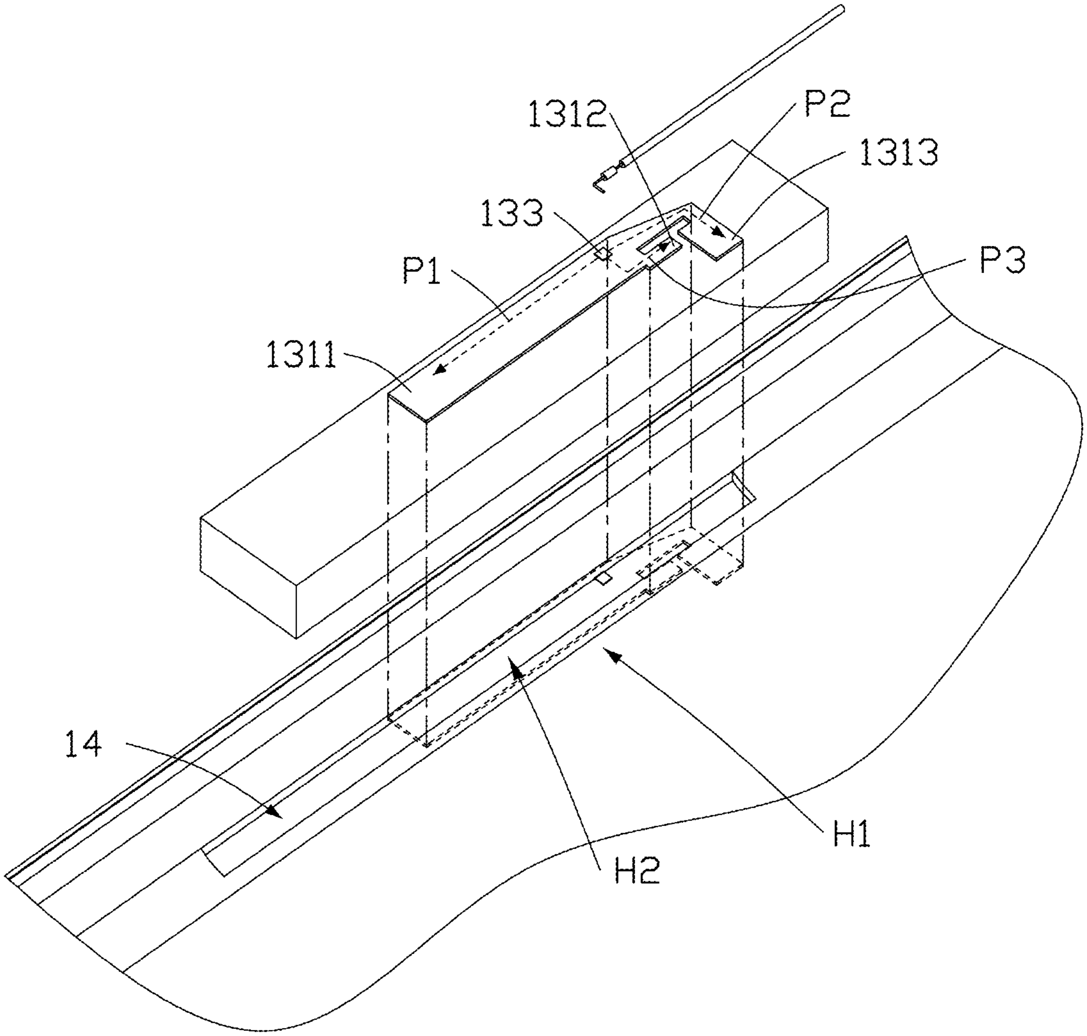
FIG. 6 is a schematic diagram of current path of the antenna structure shown in FIG. 3.

FIG. 6 shows the current path of the antenna structure 13. The current flows from the signal feed source through the match circuit 135 and is fed to the radiator 131 through the feed portion 133.

When the current flows from the feed portion 133 to the third radiation portion 1313 and the second radiation portion 1312, the third radiation portion 1313 and the second radiation portion 1312 are coupled to each other, and then a first radiation mode is excited to generate a radiation signal at a first frequency band (shown in path P3 and path P2). In the embodiment, the first frequency band is 5.8 GHz to 6 GHz, which can be applied to wireless signal transmission such as WIFI 6E mode.

When the current flows from the feed portion 133 to the first radiation portion 1311 and is coupled to the slit 14, a second radiation mode is then excited to generate a radiation signal at a second frequency band. In the embodiment, the second frequency band is 2.3 GHz to 2.5 GHz, which can be used for wireless signal transmission such as WIFI and Bluetooth.

When the current flows from the feed portion 133 to the third radiation portion 1313, a third radiation mode is then excited to generate a radiation signal at a third frequency band (shown in path P2). In the embodiment, the third frequency band is 4.6 GHz to 5 GHz, which can be applied to wireless signal transmission such as WIFI 5G mode.

When the current flows from the feed portion 133 to the first radiation portion 1311, a fourth radiation mode is then excited to generate a radiation signal at a fourth frequency band (shown in path P1). In the embodiment, the fourth frequency band is 2.9 GHz to 3.3 GHz, which can be applied to wireless signal transmission such as WIFI 2.4G mode and 5G NR.

Figure 7:
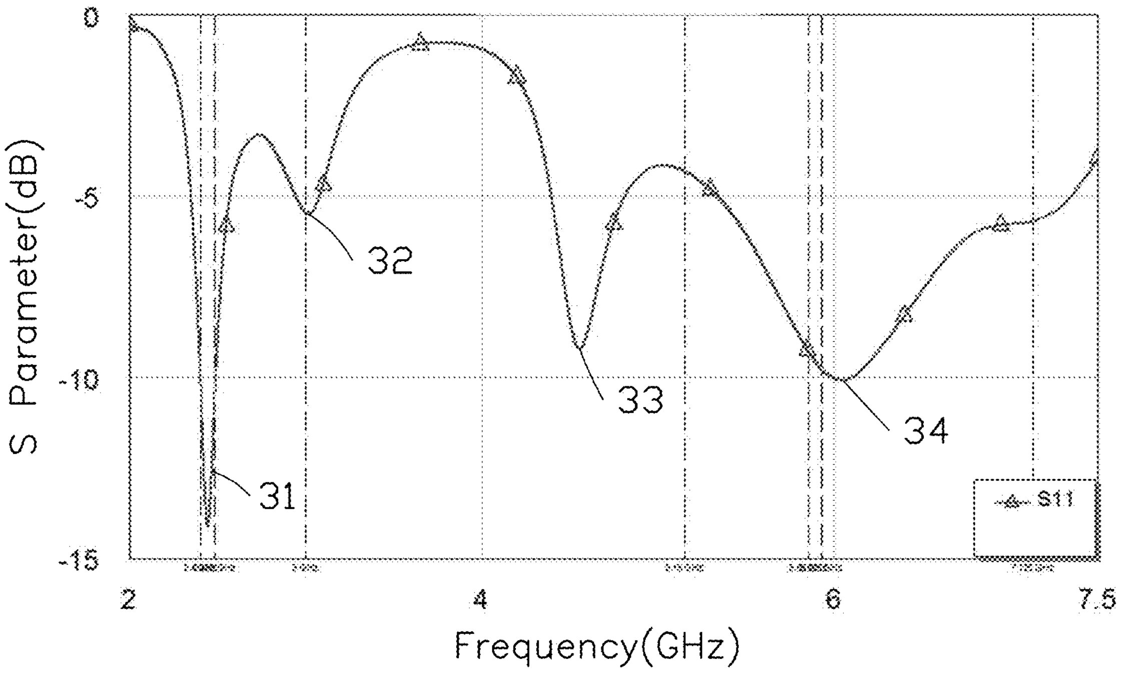
FIG. 7 is a curve between scattering parameters of the antenna structure and the signal frequency of the antenna structure shown in FIG. 3.

FIG. 7 shows the S parameter (scattering parameter) curve of the antenna structure 13. The radiator 131 forms a multi-path, such as a three branch common antenna structure, such as the first radiation portion 1311, the second radiation portion 1312, and the third radiation portion 1313, all receive the current signal fed by the feed portion 133, so that the radiator 131 forms a plurality of monopole antennas (such as WIFI 2.4G antenna, Bluetooth antenna, WIFI 5G antenna, WIFI 6E antenna), thereby generating corresponding WIFI 2.4G band, Bluetooth band, WIFI 5G band, and WIFI 6E band.

It can be understood that the smaller the S parameter of the antenna structure 13, the smaller the signal reflection loss and return loss radiated by the antenna structure 13.

As shown in curve S11, when the antenna structure 13 excites the second radiation mode, the radiation signal of the second frequency band is generated, and the S parameter at position 31 is about −13 dB;

When the antenna structure 13 excites the fourth radiation mode, the radiation signal at the fourth frequency band is generated, and the S parameter at position 32 is about −5 dB;

When the antenna structure 13 excites the third radiation mode, the radiation signal at the third frequency band is generated, and the S parameter at position 33 is about −8 dB;

When the antenna structure 13 excites the first radiation mode, the radiation signal at the first frequency band is generated, and the S parameter at position 34 is about −10 dB.

Figure 8:
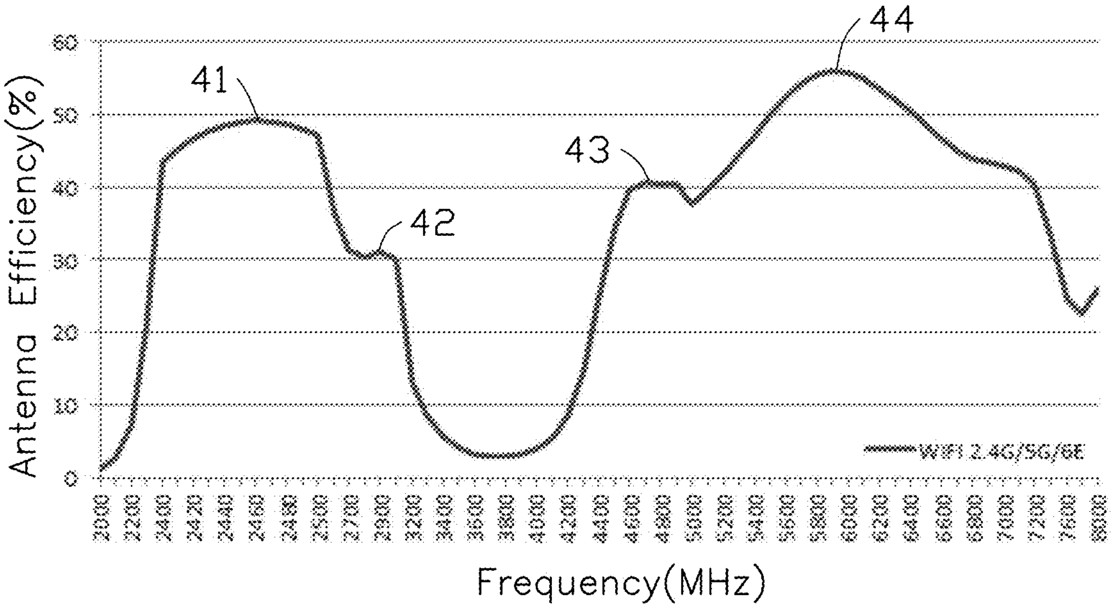
FIG. 8 is a curve between antenna efficiency of the antenna structure and the signal frequency of the antenna structure shown in FIG. 3.
Figure 9:
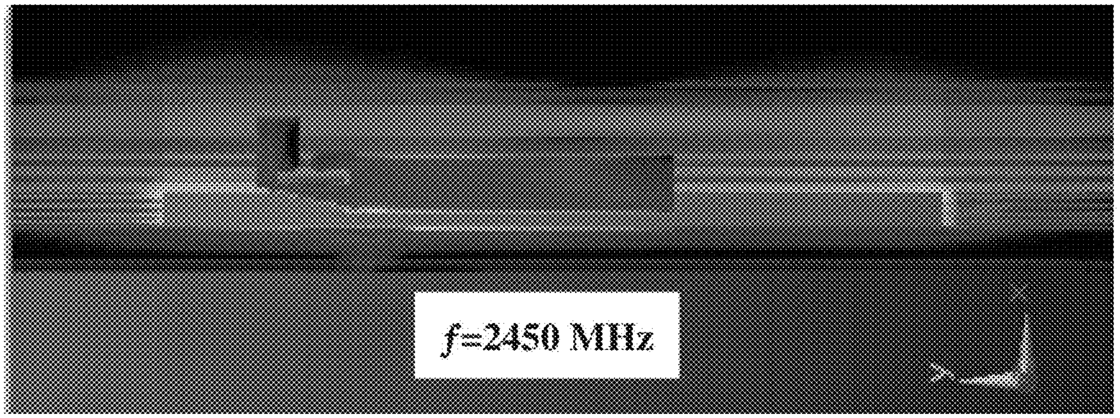
FIG. 9 is a current distribution diagram of a radiation portion of the antenna structure shown in FIG. 3 when the radiation signal frequency is 2450 MHz.
Figure 10:
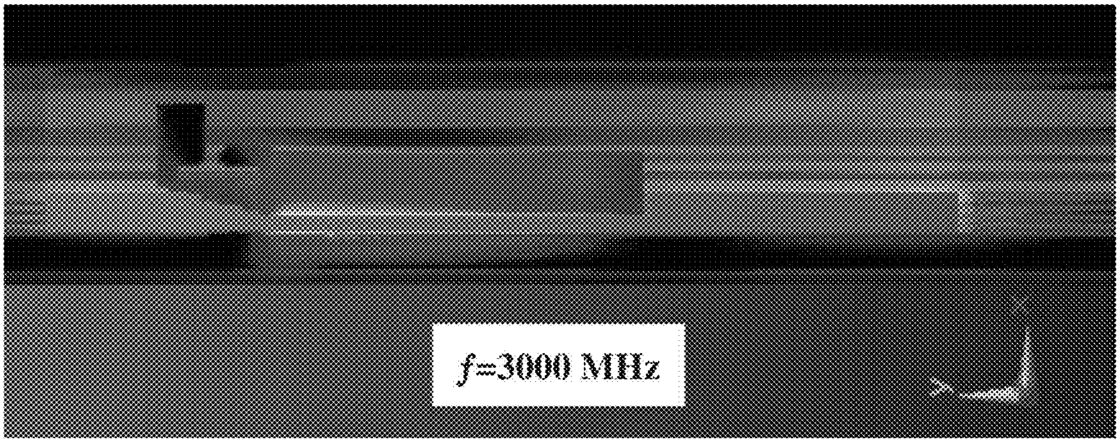
FIG. 10 is a current distribution diagram of a radiation portion of the antenna structure shown in FIG. 3 when the radiation signal frequency is 3000 MHz.
Figure 11:
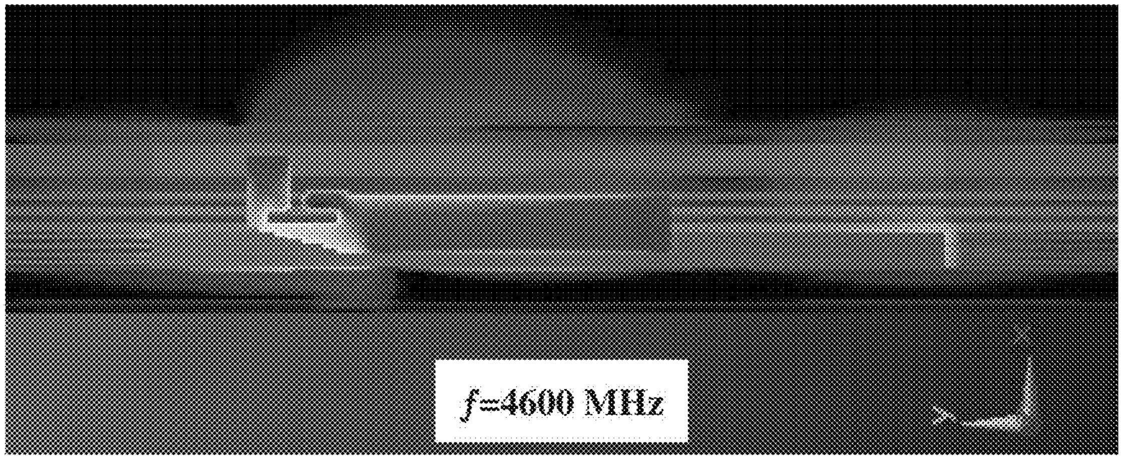
FIG. 11 is a current distribution diagram of a radiation portion of the antenna structure shown in FIG. 3 when the radiation signal frequency is 4600 MHz.
Figure 12:
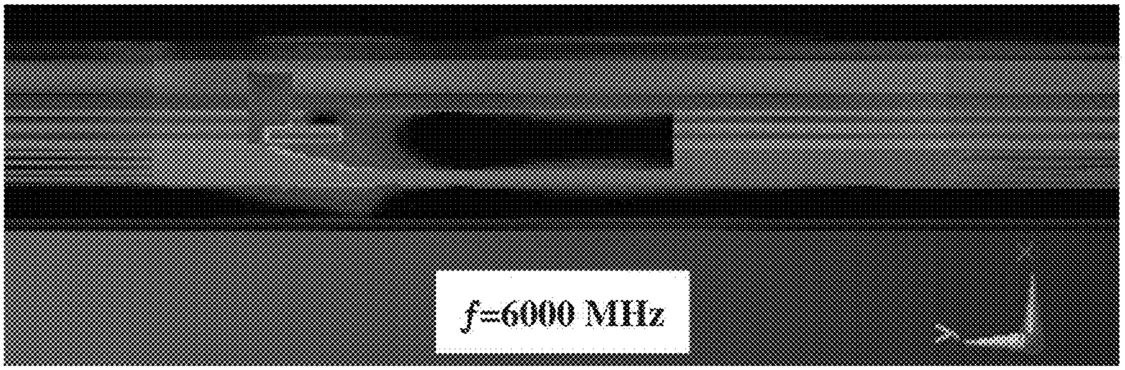
FIG. 12 is a current distribution diagram of a radiation portion of the antenna structure shown in FIG. 3 when the radiation signal frequency is 6000 MHz.

FIG. 8 shows the antenna efficiency curve of the antenna structure 13. It can be understood that the greater the antenna efficiency value of the antenna structure 13, the greater the signal intensity radiated by the antenna structure 13 and the better the performance of the antenna structure 13.

As shown in FIG. 8, when the antenna structure 13 excites the second radiation mode, the radiation signal at the second frequency band is generated, and the antenna efficiency value at position 41 is about 50% (−3.0 dB); when the antenna structure 13 excites the fourth radiation mode, the radiation signal at the fourth frequency band is generated, and the antenna efficiency value at position 42 is about 30% (−5.2 dB); when the antenna structure 13 excites the third radiation mode, the radiation signal at the third frequency band is generated, and the antenna efficiency value at position 43 is about 40% (−4.0 dB); when the antenna structure 13 excites the first radiation mode, the radiation signal at the first frequency band is generated, and the antenna efficiency value at position 44 is about 55% (−2.6).

FIGS. 9 to 12 show the current distribution on the radiator 131 when the antenna structure 13 excites different radiation modes.

In FIGS. 9 to 12, the bright areas are current concentration areas, and the dark areas are current dispersion areas.

Take the frequency of the radiation signal as 2450 MHz, when the antenna structure 13 excites the second radiation mode, the current is mainly concentrated on the first radiation portion 1311 and around the slit 14, the current flows through the first radiation portion 1311 and is coupled to the slit 14, thus generating the radiation signal at the second frequency band.

Take the frequency of the radiation signal as 3000 MHz, when the antenna structure 13 excites the fourth radiation mode, the current is mainly concentrated on the first radiation portion 1311, the current flows through the first radiation portion 1311, thus generating the radiation signal at the fourth frequency band.

Take the frequency of the radiation signal as 4600 MHz, when the antenna structure 13 excites the third radiation mode, the current is mainly concentrated on the third radiation portion 1313, the current flows through the third radiation portion 1313, thus generating the radiation signal at the third frequency band.

Take the frequency of the radiation signal as 6000 MHz, when the antenna structure 13 excites the first radiation mode, the current is mainly concentrated on the second radiation portion 1312 and the third radiation portion 1313, the current flows through the second radiation portion 1312 and the third radiation portion 1313, and the second radiation portion 1312 and the third radiation portion 1313 are coupled to each other, thus generating the radiation signal at the first frequency band.

The shape, the length, and the width of the radiator 131 can be adjusted according to the required frequency. The slit, the feed source and the ground portion 136 of the antenna structure 13 can be adjusted according to the required frequency. The antenna structure 13 is not limited to working in the above-mentioned WIFI 2.4G, Bluetooth, WIFI 5G, WIFI 6E frequency bands, it can also form diversity antennas, ultra-intermediate frequency (1447.9 MHz to 1510.9 MHz) antennas, ultra-high frequency (3400 MHz to 3800 MHz) antennas, N77, N78 and N79 antennas according to requirements, and then work in the corresponding frequency bands.

The antenna structure 13 constitutes a three-branch common antenna structure. The antenna structure 13 has good performance by setting the first radiation portion 1311, the second radiation portion 1312, the third radiation portion 1313 and the slit 14, which can improve the space utilization of the electronic device 10 and make the radiation signal bandwidth of the antenna structure 13 larger and the antenna efficiency better. The antenna structure 13 can further improve the signal impedance matching degree of the antenna structure 13 and greatly improve the antenna efficiency by setting the match circuit 135.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the exemplary embodiments described above may be modified within the scope of the claims.

What is claimed is:

1. An antenna structure applied to an electronic device, the electronic device having a metal housing, the antenna structure comprising:

a feed portion, the feed portion feeding signals into a radiator;

the radiator comprising a first end and a second end, the first end comprising a first radiation portion, the second end comprising a second radiation portion and a third radiation portion, the second radiation portion and the third radiation portion coupling to each other to radiate a radiation signal at a first frequency band; and a slit, an extension direction of the slit being parallel to the first radiation portion, the slit is spaced apart from the radiator, and the slit coupling to the first radiation portion to radiate a radiation signal at a second frequency band;

wherein the second radiation portion and the third radiation portion are disposed to enclose to form a T-shape slit, a length of the first radiation portion is greater than each of the length of the second radiation portion and the length of the third radiation portion;

wherein at least one part of the metal housing is electrically connected to the radiator to provide grounding for the radiator; and wherein when a current flows from the feed portion to the third radiation portion and the second radiation portion, the third radiation portion and the second radiation portion are coupled to each other, thereby exciting a first radiation mode to generate the radiation signal at the first frequency band; when the current flows from the feed portion to the first radiation portion, and the slit and the first radiation portion are coupled to each other, thereby exciting a second radiation mode to generate the radiation signal at the second frequency band; a frequency of the first frequency band is greater than a frequency of the second frequency band;

wherein one side of a frame of the metal housing defines the slit, and the slit is configured to be a key hole, or a subscriber identity module (SIM) card slit, or a memory card slit, or an input/output (IO) interface of the electronic device.

2. The antenna structure according to claim 1, wherein one end of the second radiation portion extends towards the third radiation portion, and the second radiation portion is coupled to the third radiation portion.

3. The antenna structure according to claim 1, wherein a length of the first radiation portion is greater than a length of the second radiation portion, and the length of the first radiation portion is greater than a length of the third radiation portion.

4. The antenna structure according to claim 1, wherein the feed portion is disposed on the first radiation portion.

5. The antenna structure according to claim 1, wherein when the feed portion supplies the current, the current flows through the third radiation portion to excite a third radiation mode to generate a radiation signal at a third frequency band; and wherein a frequency of the third frequency band is greater than the frequency of the second frequency band, and the frequency of the third frequency band is less than the frequency of the first frequency band; when the feed portion supplies the current, the current flows through the first radiation portion to excite a fourth radiation mode to generate a radiation signal at a fourth frequency band.

6. The antenna structure according to claim 4, wherein the third radiation portion comprises a first extension portion and a second extension portion, the first extension portion is vertically connected to the second extension portion, and one end of the second radiation portion extends toward the second extension portion.

7. The antenna structure according to claim 1, wherein at least one part of the slit is disposed on a first projection of the radiator to couple with the first radiation portion, the first projection of the radiator is projected along a direction perpendicular to a plane where the slit is located.

8. The antenna structure according to claim 7, wherein at least one part of the slit is further disposed on a second projection of the first radiation portion, the second projection of the first radiation portion is projected along the direction perpendicular to the plane where the slit is located.

9. The antenna structure according to claim 1, further comprising a support member, wherein the support member is configured to support and fix the radiator.

10. An electronic device comprising:

a metal housing, the metal housing having a frame; and an antenna structure comprising:

a feed portion, the feed portion feeding signals into a radiator;

the radiator comprising a first end and a second end, the first end comprising a first radiation portion, the second end comprising a second radiation portion and a third radiation portion, the second radiation portion and the third radiation portion coupling to each other to radiate a radiation signal at a first frequency band; and an extension direction of the slit being parallel to the first radiation portion, the slit is spaced apart from the radiator, and the slit coupling to the first radiation portion to radiate a radiation signal at a second frequency band;

wherein the second radiation portion and the third radiation portion are disposed to enclose to form a T-shape slit, a length of the first radiation portion is greater than each of the length of the second radiation portion and the length of the third radiation portion;

wherein at least one part of the metal housing is electrically connected to the radiator to provide grounding for the radiator; and wherein when a current flows from the feed portion to the third radiation portion and the second radiation portion, the third radiation portion and the second radiation portion are coupled to each other, thereby exciting a first radiation mode to generate the radiation signal at the first frequency band; when the current flows from the feed portion to the first radiation portion, and the slit and the first radiation portion are coupled to each other, thereby exciting a second radiation mode to generate the radiation signal at the second frequency band; a frequency of the first frequency band is greater than a frequency of the second frequency band;

wherein one side of the frame defines the slit, and the slit is configured to be a key hole, or a subscriber identity module (SIM) card slit, or a memory card slit, or an input/output (IO) interface of the electronic device.

11. The electronic device according to claim 10, wherein one end of the second radiation portion extends towards the third radiation portion, and the second radiation portion is coupled to the third radiation portion.

12. The electronic device according to claim 10, wherein a length of the first radiation portion is greater than a length of the second radiation portion, and the length of the first radiation portion is greater than a length of the third radiation portion.

13. The electronic device according to claim 10, wherein the feed portion is disposed on the first radiation portion.

14. The electronic device according to claim 10, wherein when the feed portion supplies the current, the current flows through the third radiation portion to excite a third radiation mode to generate a radiation signal at a third frequency band; and wherein a frequency of the third frequency band is greater than the frequency of the second frequency band, and the frequency of the third frequency band is less than the frequency of the first frequency band; when the feed portion supplies the current, the current flows through the first radiation portion to excite a fourth radiation mode to generate a radiation signal at a fourth frequency band.

15. The electronic device according to claim 13, wherein the third radiation portion comprises a first extension portion and a second extension portion, the first extension portion is vertically connected to the second extension portion, and one end of the second radiation portion extends toward the second extension portion.

16. The electronic device according to claim 10, wherein at least one part of the slit is disposed on a first projection of the radiator to couple with the first radiation portion, the first projection of the radiator is projected along a direction perpendicular to a plane where the slit is located.

17. The electronic device according to claim 16, wherein at least one part of the slit is further disposed on a second projection of the first radiation portion, the second projection of the first radiation portion is projected along the direction perpendicular to the plane where the slit is located.

18. The electronic device according to claim 10, further comprising a support member, wherein the support member is configured to support and fix the radiator.

* * * * *